United States Patent
Fernandes et al.

(10) Patent No.: US 11,599,428 B2
(45) Date of Patent: Mar. 7, 2023

(54) PROTECTING DATABASES IN A DISTRIBUTED AVAILABILITY GROUP

(71) Applicant: EMC IP Holding Company LLC, Hopkinton, MA (US)

(72) Inventors: Roland Anthony Fernandes, Grimsby (CA); Bharat Bhushan, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 137 days.

(21) Appl. No.: 17/153,756

(22) Filed: Jan. 20, 2021

(65) Prior Publication Data

US 2022/0229740 A1 Jul. 21, 2022

(51) Int. Cl.
*G06F 16/00* (2019.01)
*G06F 11/14* (2006.01)
*G06F 16/28* (2019.01)

(52) U.S. Cl.
CPC ...... *G06F 11/1469* (2013.01); *G06F 11/1451* (2013.01); *G06F 11/1461* (2013.01); *G06F 11/1464* (2013.01); *G06F 16/284* (2019.01); *G06F 2201/80* (2013.01)

(58) Field of Classification Search
None
See application file for complete search history.

(56) References Cited

U.S. PATENT DOCUMENTS 10,719,407 B1\* 7/2020 Chockalingam .... G06F 11/1461
11,144,405 B2\* 10/2021 Bikumala ........... G06F 11/1469

\* cited by examiner

*Primary Examiner* — Bai D Vu
(74) *Attorney, Agent, or Firm* — Staniford Tomita LLP (57) ABSTRACT

A determination is made that a relational database management system (RDBMS) is configured as a distributed availability group. The distributed availability group spans first and second availability groups. Each availability group includes a cluster of servers hosting replicas of a database. One of the first or second availability groups functions as a primary availability group. Another of the first or second availability groups functions as a secondary availability group that is available as a failover target should the primary availability group become unavailable. A name of the distributed availability group is obtained. A first server in the first availability group is directed to backup a replica of the database being hosted by the first server. The directing includes instructing the first server to index the backup against the name of the distributed availability group.

18 Claims, 8 Drawing Sheets

```
SELECT is_distributed
FROM sys.dm_hadr_availability_group_states States
INNER JOIN master.sys.availability_groups Groups ON States.group_id = Groups.group_id
where name = '<Distributed Availability Name /AAG Name>';
GO
```

FIG. 5

```
SELECT primary_replica as Primary_AAG_Name
FROM sys.dm_hadr_availability_group_states States
INNER JOIN master.sys.availability_groups Groups ON States.group_id = Groups.group_id
where name='<Distributed Availblity Name>'
```

FIG. 6

```
SELECT automated_backup_preference, primary_replica_name, group_id
FROM sys.dm_hadr_availability_group_states States
INNER JOIN master.sys.availability_groups Groups ON States.group_id = Groups.group_id
Where name= '<primary AAG name>'
GO
select TOP (16) replica_server_name from sys.availability_replicas where group_id=<AAG Group id>' AND replica_server_name != <primary replica name> AND backup_priority != 0 order by backup_priority desc
GO
```

FIG. 7

```
SELECT name
FROM sys.dm_hadr_availability_group_states States
INNER JOIN master.sys.availability_groups Groups ON States.group_id = Groups.group_id
where is_distributed = 1
GO
```

FIG. 8

```
SELECT database_name
FROM sys.dm_hadr_availability_group_states States
INNER JOIN master.sys.availability_groups Groups ON States.group_id = Groups.group_id
INNER JOIN sys.availability_databases_cluster AGDatabases ON Groups.group_id = AGDatabases.group_id
where name = (SELECT primary_replica
FROM sys.dm_hadr_availability_group_states States
INNER JOIN master.sys.availability_groups Groups ON States.group_id = Groups.group_id
where name = <Distributed Availability Group Name>)
GO
```

PROTECTING DATABASES IN A DISTRIBUTED AVAILABILITY GROUP

TECHNICAL FIELD

The present invention relates generally to the field of information management, and, more particularly, to data protection.

BACKGROUND

High-availability clusters (also known as HA clusters or failover clusters) are groups of computers supporting server applications that can be reliably utilized with a minimum amount of down-time. High-availability software is used to form groups or clusters of redundant computers so that service can continue with little or no interruption when system components fail.

Without clustering, if a server running a particular application crashes, the application will be unavailable until the crashed server is fixed. HA clustering remedies this situation by detecting hardware faults, software faults, or both. Upon detection of a fault, the application can immediately be restarted on another system without requiring administrative intervention, a process known as failover.

High-availability clusters can be used to support critical databases. High-availability can be achieved by maintaining redundant copies of the database across different servers in different sites. If one site suffers a failure, the other site can continue processing so that business operations are not disrupted.

Having a high-availability database system, however, does not remove the need to have a backup system. While a backup system may not include the infrastructure to actually run a database backup without first restoring it, the backup system can be used to return the database system to a previous point in time and help to protect against data loss due to, for example, data corruption and user error.

Current backup systems, however, do not readily recognize high-availability database systems. More particularly, should a database happen to be failed over, current backup systems do not recognize the failover event. As a result, the database may be left unprotected or the database is treated as a new database. Leaving the database unprotected can leave the enterprise exposed to the threat of data loss. Treating the database as a new database can lead to a new full backup being conducted even though much of the data may already have been backed up previously before the failover. Further, the backup will not be linked to the previous backups conducted before the failover. This can make recovery very difficult and time-consuming. Thus, there is a need for improved systems and techniques for data protection in high-availability systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. The variable N and other similar index variables are assumed to be arbitrary positive integers greater than or equal to two.

Figure 1:
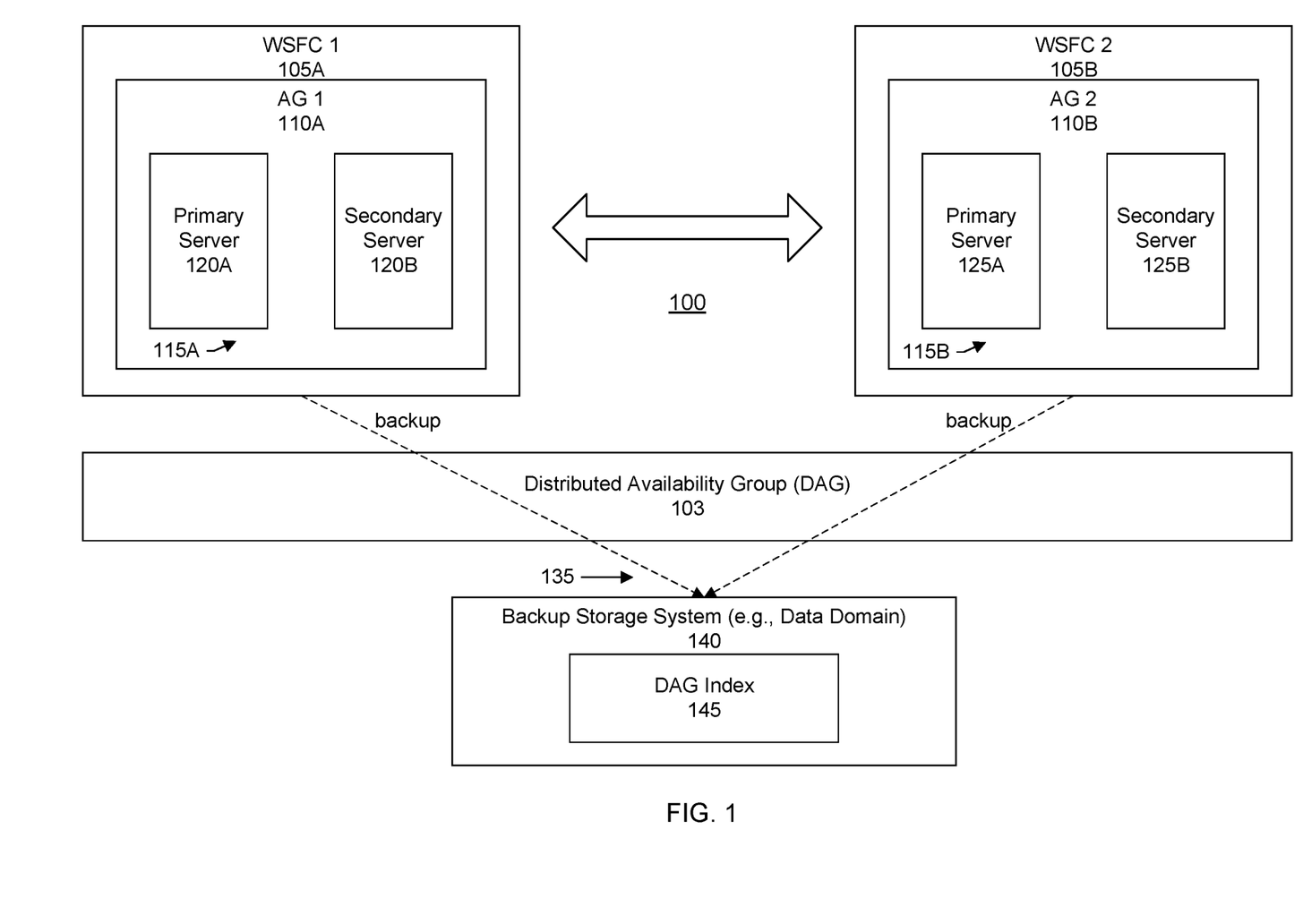
FIG. 1 shows a block diagram of an information handling system having a distributed availability group architecture in accordance with one or more embodiments.

FIG. 1 shows a simplified block diagram of an information system 100 having a data protection system for backing up databases that are part of a distributed availability group 103. In a specific embodiment, the data protection system includes products referred to as PowerProtect® and Data Domain® as provided by Dell EMC of Hopkinton, Mass. and the databases are a relational database management system (RDBMS) referred to as SQL Server® as provided by Microsoft Corporation of Redmond, Wash. It should be appreciated, however, that aspects and principles of the systems and techniques described herein can be applied to other data protection and relational database management systems provided by other vendors. It should be appreciated that the blocks, components, and modules shown in FIG. 1 and elsewhere may be functional and there can be many different hardware configurations, software configurations, or both to implement the functions described.

In the example shown in FIG. 1, there is a first cluster 105A and a second cluster 105B. The first cluster includes a first availability group (AG) 110A having a first set of servers or nodes 115A. The second cluster includes a second availability group 110B having a second set of servers or nodes 115B. An availability group may be referred to as an Always On™ Availability Group (AAG). The first availability group includes servers 120A,B. Server 120A is functioning as a primary server in the first availability group. Server 120B is functioning as a secondary server in the first availability group.

The second availability group includes servers 125A,B. Server 125A is functioning as a primary server in the second availability group. Server 125B is functioning as a secondary server in the second availability group. Distributed availability group (DAG) 103 connects the first and second availability groups. Database copies hosted by the servers in the distributed availability group are backed up 135 to a backup storage system 140 (e.g., Data Domain).

An index or DAG index 145 stores metadata about the backups. The index may include any competent data structure storing metadata to organize, catalog, and manage backups. The metadata can be accessed to browse or lookup a particular backup. The metadata may include information such as a timestamp (e.g., time and date) of a backup, location where the backup is stored, size of the backup, version history, type of backup, and other properties or attributes associated with the backup. In an embodiment, the backups are indexed using a name of the distributed availability group. For example, the name of the distributed availability group may be identified as a source of the backups—rather than a name of a particular server in the distributed availability group from which the backup was conducted.

A distributed availability group is a special type of availability group that spans two separate availability groups. The availability groups that participate in a distributed availability group do not need to be in the same location. They can be physical, virtual, on-premises, in the public cloud, or anywhere that supports an availability group deployment.

A distributed availability group can be used to facilitate: 1) disaster recovery and easier multi-site configurations; 2) migration to new hardware or configurations, which might include using new hardware or changing the underlying operating systems; and 3) increasing the number of readable replicas beyond eight in a single availability group by spanning multiple availability groups.

In an embodiment, the clusters are Windows Server Failover Clusters (WSFC). A WSFC is a group of independent servers that work together to increase the availability of applications and services. An RDBMS, such as SQL Server, can use the services provided by WSFC to support high-availability and disaster recovery. More particularly, in the example shown in FIG. 1, the distributed availability group spans two availability groups (AG 1 and AG 2), each configured on its own WSFC cluster. The distributed availability group has a total of four replicas, with two in each availability group.

For example, a primary replica of a database may be replicated across each secondary server of the first availability group of the first cluster and also replicated to the second availability group of the second cluster. In this example, the first availability group may be referred to as the primary availability group. Writes to the primary database replica are replicated to each of the other database replicas of the distributed availability group. These other database replicas may be read-only copies of the database. If the first availability group becomes unavailable, the second availability group can assume the role of the primary availability group so that writes to the database can continue with little or no disruption.

Current backup systems do not recognize distributed availability groups. Specifically, current backup systems are limited to conducting backups from a single availability group. When that availability group is offline, current backup systems are not able to continue backups from the other online availability group. Instead, any backups done from the other availability group are treated as a separate or different client. This has the effect of breaking or splitting the backup chain of the database.

For example, backups may initially be conducted from the first availability group. The backups may have been configured to specify an initial backup as being a full backup and subsequent backups as being incremental backups (e.g., differential backups). Backing up only changes to the database can dramatically reduce the time and resources needed to conduct a backup. After a failover to the second availability group, however, current backup systems treat the backup of the database from the second availability group as being a new or different database rather than as the same database that was being backed up from the first availability group. Thus, rather than performing an incremental backup of the database, a full backup is performed even though much of the data may already have been backed up using the first availability group before the failover event occurred.

In other words, in a distributed availability group, data is replicated between first and second sites. These sites may be geographically remote from each other. One site can function as a primary site while another site functions as a secondary site. If the primary site suffers a failure, the other secondary site can be brought up as a primary site with little or no delay. Backups may be conducted on the primary site as part of normal operations. However, if the primary site becomes unavailable and the secondary site assumes the role of the primary site, conventional backup systems do not recognize that the database to be backed up at the site that is now currently functioning as the primary site is the same database that was at the original primary site. Instead, the same database may be treated as a different separate database and may be backed up against a different client (e.g., using a name of a client at the now currently functioning primary site). The backup chain for the database would not be maintained, thereby frustrating recovery among other things. For example, rather than conducting an incremental or differential backup of the database at the site now functioning as the primary site, a full backup may be conducted. Conducting a full backup can require much more time to complete (and storage space) as compared to an incremental backup. A full backup may require 10 to 11 or more hours to complete depending upon the size of the database. The time to complete the backup may violate service level agreements.

In an embodiment, a name of the distributed availability group is used as the name of the index client. This allows the backup chain to be maintained irrespective of which AAG or node (e.g., server) in the AAG is used to do the backup, thereby allowing for incremental or differential backups in cases of a failover. Backups of a database from any node or server will be recognized as part of the same database. The effect is that the failover site can be recognized as having the same database that was at the previously functioning primary site. The name of the distributed availability group functions as an identifier that is common across both configured sites and is recognizable by the customer.

Figure 2:
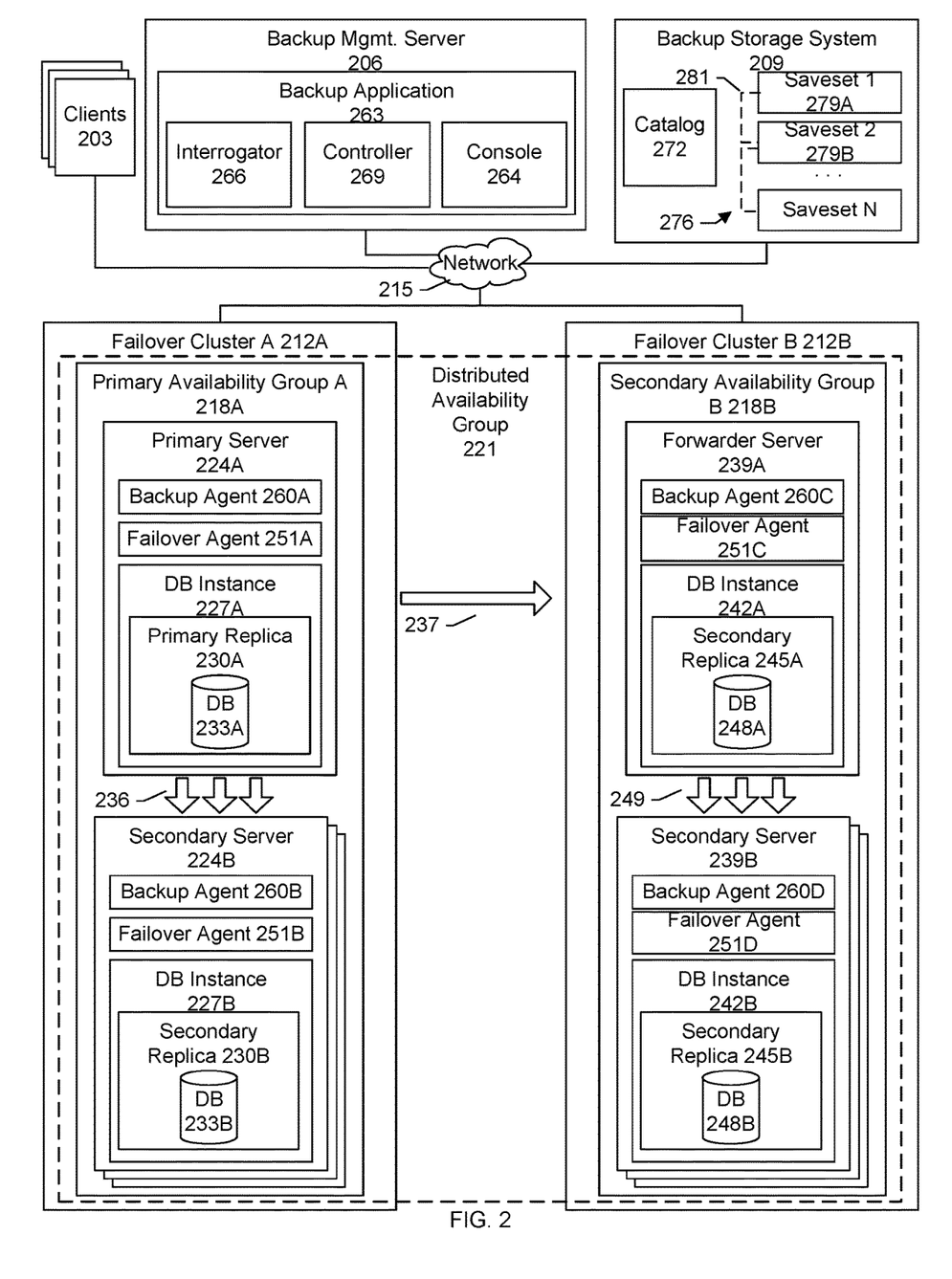
FIG. 2 shows a more detailed block diagram of the distributed availability group architecture in accordance with one or more embodiments.

FIG. 2 shows a more detailed block diagram of the system shown in FIG. 1. In the example shown in FIG. 2, there are a set of clients 203, a backup management server 206, a backup storage system 209, a first cluster of servers or nodes 212A, and a second cluster of servers or nodes 212B. A cluster may be referred to as a failover cluster. A network 215 interconnects each of the different components.

A user, such as an administrator, may configure a distributed availability group in the database system by grouping the clusters of servers into availability groups 218A,B; and then grouping the availability groups into a distributed availability group 221. Table A below shows an example of a code snippet for creating a distributed availability group, along with setting some configuration options.

TABLE A

```
CREATE AVAILABILITY GROUP [<DistributedAGName>]
    WITH (DISTRIBUTED)
    AVAILABILITY GROUP ON
    'AG1' WITH -Enter name of first availability group
    (
        LISTENER_URL = '<AG1 endpoint address'>, -- Endpoint
URL from AG1
        AVAILABILITY_MODE = ASYNCHRONOUS_COMMIT,
        FAILOVER_MODE = MANUAL,
        SEEDING_MODE = MANUAL
    ),
    'AG2' WITH - Enter name of second availability group
    (
        LISTENER URL = '<AG2 endpoint address'>, -- Endpoint
URL from AG2
        AVAILABILITY_MODE = ASYNCHRONOUS_COMMIT,
        FAILOVER_MODE = MANUAL,
        SEEDING_MODE = MANUAL
    );
```

As shown in the example of table A above, the administrator, via the database system, may specify a name for the distributed availability group, the availability groups to be included in the distributed availability group, and other configuration options.

Each availability group 218A,B includes a set of servers. At any given time, one of the first or second availability groups may function as a primary availability group, while another of the first or second availability groups may function as a secondary availability group.

For example, the first availability group (functioning as a primary availability group) may include a server 224A functioning as a primary server and one or more other servers 224B functioning as secondary servers. A primary server may be referred to as an active server (or active node). A primary server can be a server in the cluster that responds to read-write operations issued by the clients. A secondary server may be referred to as an inactive, non-active, or passive server. A secondary server can be a server in the cluster that is in an idle, standby, or listening state or mode.

The primary server hosts a database instance 227A having a primary replica 230A hosting a primary copy 233A of a database (e.g., database and log files). The primary database copy may be a read-write copy that accepts writes issued by the clients. A secondary server hosts a database instance 227B having a secondary replica 230B hosting a secondary copy 233B of the database. The secondary database copy may be a read-only copy. Changes to the primary database copy may be replicated 236 to each of the secondary database copies at the secondary servers.

In a distributed availability group architecture, such changes may further be replicated 237 to second availability group 218B. The second availability group may thus function as a secondary availability group. The secondary availability group includes a set of servers or nodes including a server 239A functioning as a forwarding server and one or more other servers 239B functioning as secondary servers. The forwarding server hosts a database instance 242A having a secondary replica 245A also hosting a secondary copy 248A of the database. A secondary server of the second availability group hosts a database instance 242B having a secondary replica 245B also hosting a secondary copy 248B of the database.

During operation, clients issue write operations to the database. The writes are received by the primary server, applied to the primary copy of the database, and replicated to each secondary server of the primary availability group and also to the secondary availability group. In particular, the forwarding server at the secondary availability group may receive the database changes from the primary availability group and forward 249 the changes to each secondary server of the secondary availability group so that the changes can be applied to the secondary copies of the database. The secondary copies of the database may be made available for read operations such as for purposes of reporting.

Replication of the database can occur asynchronously, synchronously, or including a combination of both depending upon a configuration that may be set by the administrator user. For example, the primary server may send data synchronously to the secondary servers of the primary availability group and send the data asynchronously to the forwarder at the secondary availability group which, in turn, sends the data synchronously (or asynchronously) to the secondary servers of the secondary availability group.

Thus, the servers in the primary availability group may be kept in sync with synchronous data movement; while the servers in the secondary availability group may be kept in sync with asynchronous data movement. The primary and secondary availability groups may be at different and geographically separated sites. For example, a site for the primary availability group may be Las Vegas, Nev. A site for the secondary availability group may be Philadelphia, Pa.

Each server may include a database failover agent (e.g., failover agents 251A-D). The failover agents are responsible for monitoring the overall health of the availability group and when needed or otherwise instructed by the administrator (such as in cases of an online migration of the database) failing over from an availability group of a distributed availability group to another target availability group of the distributed availability group. The failover to the other availability group causes a swap in the roles of the availability group.

For example, when the failover event occurs, the secondary availability group switches its role from functioning as a secondary to functioning as the primary. That is, the forwarder server in the secondary availability group (now functioning as the primary availability group) switches to functioning as the primary server. Thus, the forwarding server (now functioning as the primary server) is now responsible for receiving writes from the clients, applying the writes to its database replica, and replicating the changes to the other secondary servers of its availability group. That is, the forwarder or secondary server at the second availability group can assume the responsibilities of a primary or active server and thus be available for read-write connections from the clients.

When the first availability group becomes available again, the first availability group may assume the role of a secondary availability group. Alternatively, the first availability group may transition back to functioning as a primary availability group; while the second availability group transitions back to functioning as a secondary availability group. This type of failover and failback provided by the distributed availability group architecture helps to ensure the availability of data should an availability group become off-line as a result of some type of system failure or upon command by an administrator user.

The distributed availability group architecture, however, is not a substitute for conducting regular backups of the database. Conducting regular backups helps to protect against corruption (e.g., corruption due to bugs such as storage firmware bugs), human error, hackers, and other potential problems. Thus, the system shown in FIG. 2 includes a backup system including the backup server, backup storage system, and backup agents 260A-D installed at each server or node of the distributed availability group. The backup server includes a backup application 263 including a console 264, an interrogator 266 and controller 269. The backup storage system includes a catalog 272 and savesets 276 into which backups of the database are stored.

The backup server with backup application is responsible for managing the backup (and recovery) of the database. In particular, the console provides a user interface to the backup application and allows an administrator to configure the backup system. The interface may include a graphical user interface (GUI). The GUI allows the administrator to browse the various backups of a database that are available for restore. Configuration may include defining backup policies, backup windows and schedules, backup levels (e.g., full backup, logs only backup, cumulative incremental backups), backup frequency, backup rules, and the like.

Backups may be specified as savesets. A saveset may include attributes identifying source data to be backed up and other configuration information. A saveset may identify a database instance (e.g., SQL Server instance) for backup. When a time to conduct a backup arrives, the backup application may parse the saveset to identify, among other things, the data source to be backed up and type of backup to perform. For example, the administrator user may use the console to define a backup strategy or policy in which a full backup of the database is performed weekly, such as on a Sunday or other day that experiences low demand, while a logs-only backup is performed daily. Thus, a saveset may include the database itself, transaction logs associated with the database, or both.

Savesets are written to media of the backup storage system. A saveset may include a single file or multiple files. A saveset may include actual data that is backed up along with associated metadata describing the data included in the backup. The metadata may include, for example, a timestamp of the backup, a name against which the backup is indexed, and other attributes. Backup data within a saveset at the backup storage system may be stored in a format different from an original format used by the database system. For example, the backup may be saved in a compressed or deduplicated format.

The catalog stores indexing information and other metadata about the various savesets. The administrator user can browse the catalog to see the various backups of the database that are available for restoring. In an embodiment, backups of a database may be browsed using a name of a distributed availability associated with the database.

The backup application coordinates with a backup agent at a server in the distributed availability group to backup a database hosted by the server to the backup storage system. In an embodiment, the interrogator of the backup application is responsible for querying a server (e.g., SQL Server) of the distributed availability group to obtain backup configuration information, backup preferences, or other settings associated with performing the backup. These settings may be stored by the database system (e.g., SQL Server) and separate from the backup application. Thus, the administrator user can configure at least a portion of the backup configuration settings using an interface of the database system and with which the administrator may already be familiar with.

In a specific embodiment, the settings include a name of the distributed availability group and a preference specifying whether backups should be performed using a primary server or a secondary server of an availability group (e.g., primary availability group). For example, the administrator user may designate a secondary server to use for backups. Performing backups using a secondary server allows a primary server to remain dedicated to servicing client production requests. In some cases, however, certain backup operations and options may require performing backups using a primary server. For example, in some cases, differential backups may require conducting such backups on a non-copy-only source. That is, differential backups may not be supported on a secondary server. Thus, the administrator user may instead specify that backups be triggered on the primary server in order to take advantage of the benefits of differential backups. As another example, log backups may not be able to be truncated on the secondary server. Truncating a log after a backup may require performing the backup on the primary server.

Upon obtaining the name of the distributed availability group and server at which the backup should be triggered, the backup application controller directs the preferred server in the cluster to perform a backup of the database hosted by the server. The preferred server may be a server functioning as a primary server and thus in an availability group functioning as a primary availability group.

In other words, the interrogator, prior to conducting a backup, is responsible for querying the database system to obtain configuration information associated with the database system. For example, a query may be transmitted to an active server of the database system. The returned configuration information may include information describing an architecture of the database system and, in particular, whether the database system has been configured with the distributed availability group architecture. The information, including a name of the distributed availability group, may be passed to the controller. The controller then directs or instructs the appropriate or preferred server of the distributed availability group to launch a backup of the database replica hosted by the server. In an embodiment, the instructing includes passing a name of the distributed availability group to the server so that the server can index the backup against the name of the distributed availability group.

More particularly, the backup application controller passes to the preferred server (or, more specifically, to the backup agent at the preferred server) the name of the distributed availability group and an instruction to index the backup of the database using the name of the distributed availability group. Using the name of the distributed availability group rather than the name of the preferred server allows for maintaining an unbroken chain of backups for the database even if backups are triggered from different servers as might occur during a failover situation.

That is, savesets or backups of the database are configured with and stored under the name of the distributed availability group and not the name of the server at which a backup is triggered. For example, a first saveset 279A may correspond to an initial backup of a database at a first time. The initial backup may have been conducted or triggered on a first server in a distributed availability group. A second saveset 279B may correspond to a subsequent backup of the database at a second time, after the first time. The subsequent backup may have been conducted or triggered on a second server in the distributed availability group, different from the first server. Such a scenario may be present when a failover has occurred.

Both savesets or backups, however, may be linked 281 using a name of the distributed availability group. Thus, each saveset may be associated with or include metadata specifying the name of the distributed availability group. This allows for maintaining a continuous backup chain for the database regardless of where or on what server the backup was triggered; and for the subsequent backup to be conducted as an incremental or differential backup. Different backups of the same database conducted on different host servers of the distributed availability group are linked and stored under the same distributed availability group name. In particular, indexing the saveset or backup against the name of the distributed availability group allows for recognizing that the subsequent backup can be a differential backup because the database currently being backed up is the same database that was previously backed up during the initial backup.

In an embodiment, the catalog includes an index for the database backups. The index may include a set of directories. A name of a top level directory may correspond to a name of a distributed availability group, rather than a name of a particular host server. Within the directory, there can be a set of savesets. Each saveset may correspond to a backup at a particular point in time of a database or database replica in the distributed availability group. At least some of the backups may have been conducted using different servers in the distributed availability group hosting the database replicas. Each saveset, however, may include or be associated with an attribute identifying the name of the distributed availability group. This allows for maintaining a relationship structure among the backups of a particular database even if the backups were conducted using different servers in different availability groups of the distributed availability group.

Figure 3:
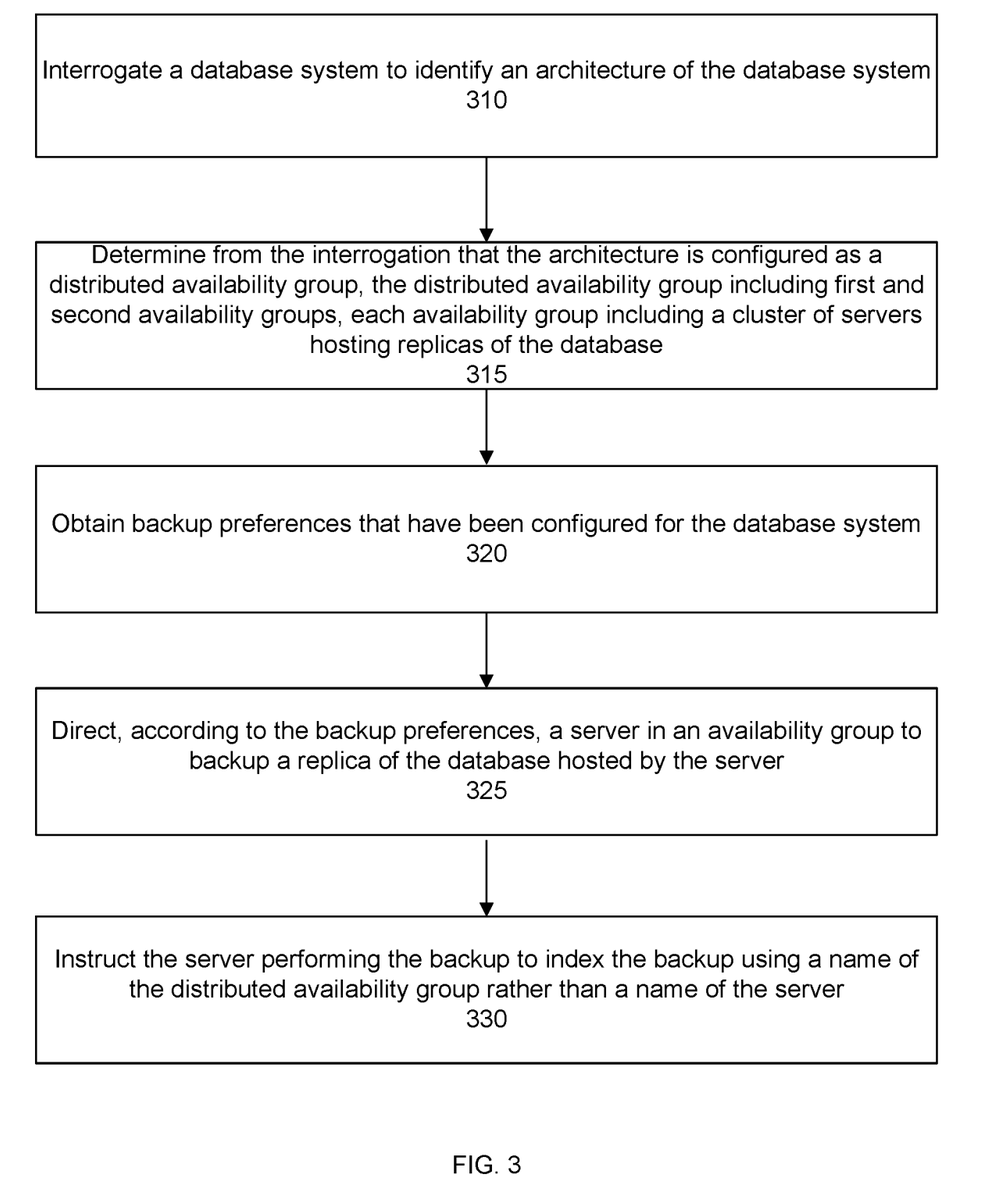
FIG. 3 shows an overall flow for conducting backups in the distributed availability group architecture in accordance with one or more embodiments.

FIG. 3 shows an overall flow for performing backups of a database in a distributed availability group. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 310, a database system is interrogated to identify an architecture of the database system. In a step 315, a determination is made from the interrogation that the architecture is configured as a distributed availability group. As such, the distributed availability group includes first and second availability groups. Each availability group includes a cluster of servers hosting replicas of the database. In a step 320, backup preferences that have been configured for the database system are obtained. In a step 325, a server in the distributed availability group is directed to backup a replica of the database being hosted by the server.

In a step 330, the server performing the backup is instructed to index the backup using a name of the distributed availability group, rather than a name of the server. In other words, databases that are part of a distributed availability group are indexed under the same "client" irrespective of which physical node or server of the distributed availability group is used to do the backup.

This is accomplished by using the distributed availability group name as a dummy client name to index all the database backups belonging to the distributed availability group. Doing so allows for tracking and chaining all levels of a database backup even if different physical nodes belonging to both local and remote availability groups are used to do the backups. For the restore, the backups can be browsed under the distributed availability group name and the databases can be restored using a redirected restore (e.g., restoring a previously backed up database to a different or new server host).

Distributed availability groups can have various architectures. The technique of using the distributed availability group name for indexing can be applied to other architectures including domain-less and cluster-less distributed availability groups, so long as the user performing the backup has backup privileges on all physical nodes that are part of the distributed availability group.

Figure 4:
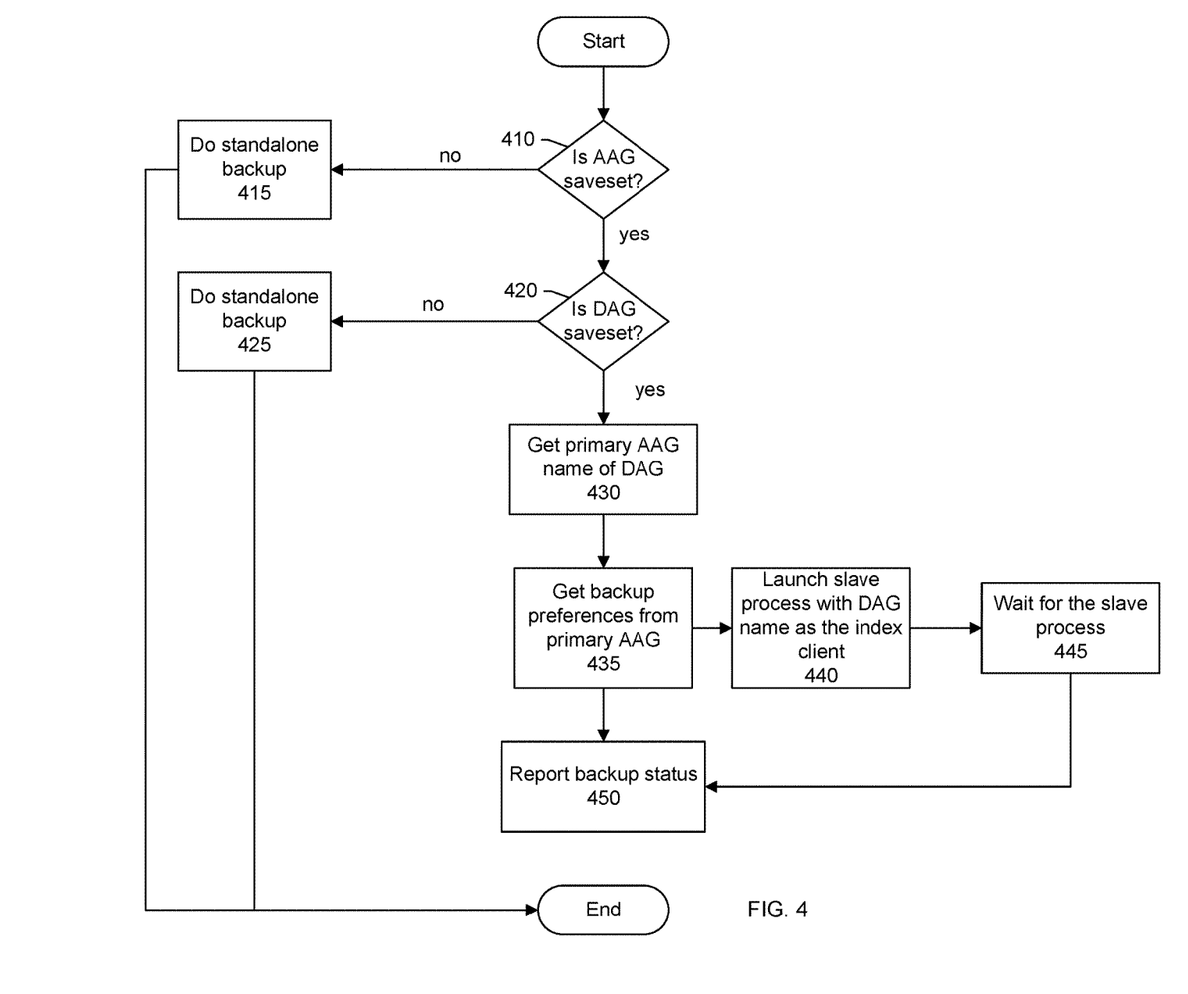
FIG. 4 shows further detail of a flow for conducting backups in an information handling system having a distributed availability group architecture in accordance with one or more embodiments.

FIG. 4 shows a more detailed flow for performing database backups. In an embodiment, an algorithm or set of diagnostic steps is provided for checking or determining a type of saveset. There can be several types of savesets including a standalone savesets, availability group savesets, and distributed availability group savesets. A standalone saveset may include just a single system or SQL Server on which backups are conducted. An availability group saveset includes determining or identifying the primary and secondary servers of the availability group; and then determining whether backups are to be conducted on the primary server or on a secondary server.

A saveset that is not an availability group saveset cannot be a distributed availability group saveset. If, however, the saveset is found to be an availability group saveset, a further check is performed to determine whether the client name that was passed corresponds to a distributed availability group. If the name corresponds to a distributed availability group, the primary availability group from the distributed availability group is identified. Backup preferences are obtained from the primary availability group. Upon obtaining the backup preferences, a backup process is launched or triggered on the preferred server in the primary availability group (e.g., primary server or secondary server of the primary availability group). The launching or triggering of the backup process includes passing a name of the distributed availability group to the backup process on the preferred server for indexing of the backup.

In particular, in a step 410, parameters of a saveset are reviewed to determine whether the saveset is associated with an availability group. If not, a standalone backup is conducted (step 415). If, however, the saveset is associated with an availability group, in a step 420, a determination is made as to whether the availability group is of a distributed availability group type. If not, an availability group type backup is conducted (step 425).

If, however, the availability group is of the distributed availability group type, in a step 430, the primary availability group of the distributed availability group is obtained. In a step 435, backup preferences are obtained from the primary availability group. The backup preferences specify whether backups are to be triggered on a primary server in the primary availability group or on a secondary server in the primary availability group. In a step 440, according to the backup preferences, a slave or backup process is launched on one of the primary or secondary server with the distributed availability group name as the index client. In a step 445, the system waits or pauses to allow the slave or backup process to run so that the database can be backed up from the one of the primary or secondary server to the backup storage system. In a step 450, backup status is reported (e.g., backup completed successfully or backup failed).

Table B below shows further detail of a flow for performing database backups.

TABLE B

Figure 5:
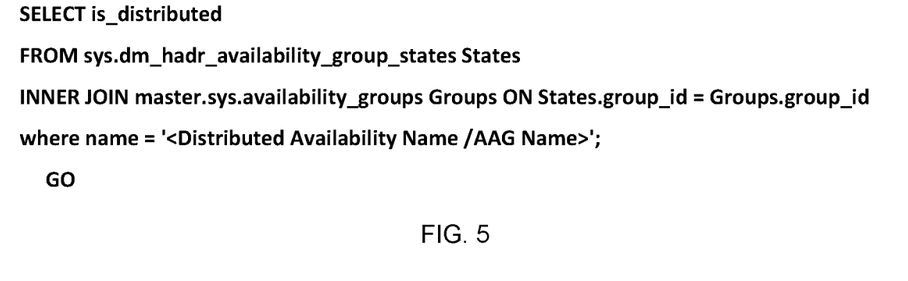
FIG. 5 shows a SQL code snippet for identifying a distributed availability group name in accordance with one or more embodiments.
Figure 6:
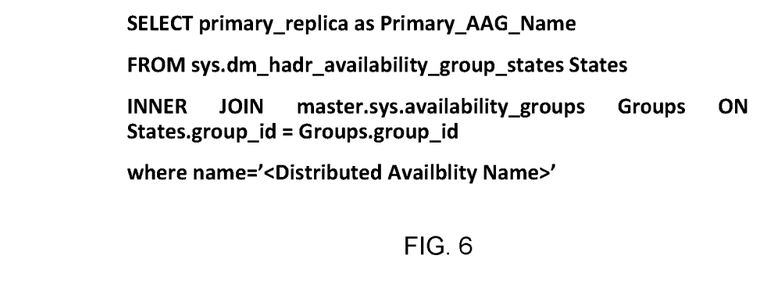
FIG. 6 shows a SQL code snippet for identifying a primary availability group name of the distributed availability group in accordance with one or more embodiments.
Figure 7:
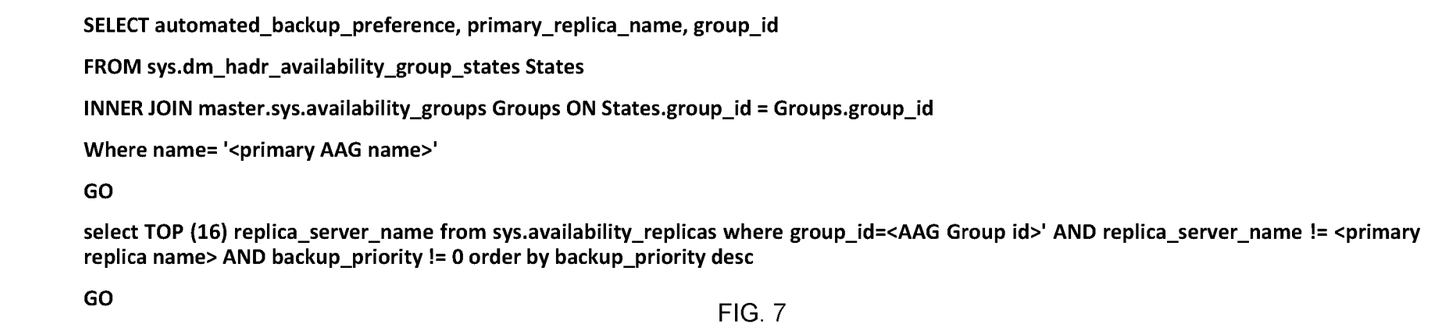
FIG. 7 shows a SQL code snippet for retrieving backup preferences from the primary availability group in accordance with one or more embodiments.

| Step | Description |
|---|---|
| 1 | Parse the saveset name passed in command line to extract the availability group/distributed availability group name. |
| 2 | If an availability group/distributed availability group name is found, determine if the name corresponds to a distributed availability group name. FIG. 5 shows an example of a code snippet that may be used to determine whether there is a distributed availability group to backup. |
| 3 | Get the primary availability group name of the distributed availability group. FIG. 6 shows an example of a code snippet that may be used to obtain a name of the primary availability group in a distributed availability group. |
| 4 | Get the backup preferences of the primary availability group. FIG. 7 shows an example of a code snippet that may be used to obtain the backup preferences. |
| 5 | Launch a backup slave process using the existing federated process on the physical node selected for backup in Step 4 passing the distributed availability group name as the index client. |
| 6 | Wait for slave process to exit and report the status returned by the slave process when it exits. |

Table C below shows an example of a flow for listing databases of distributed availability groups.

TABLE C

Figure 8:
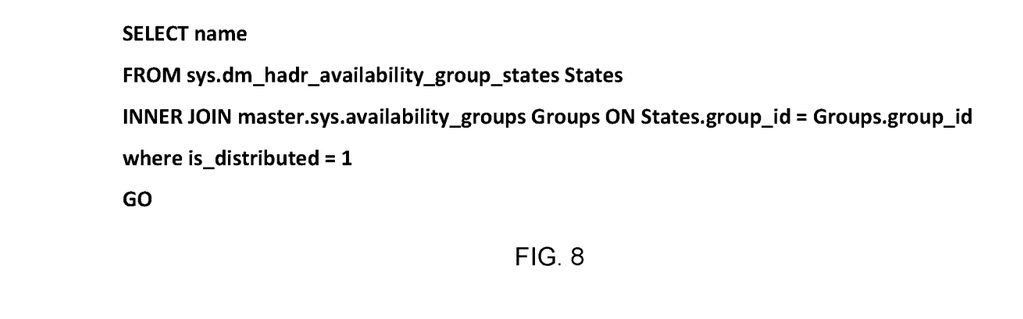
FIG. 8 shows a SQL code snippet for collecting all distributed availability group names configured on a current SQL server in accordance with one or more embodiments.
Figure 9:
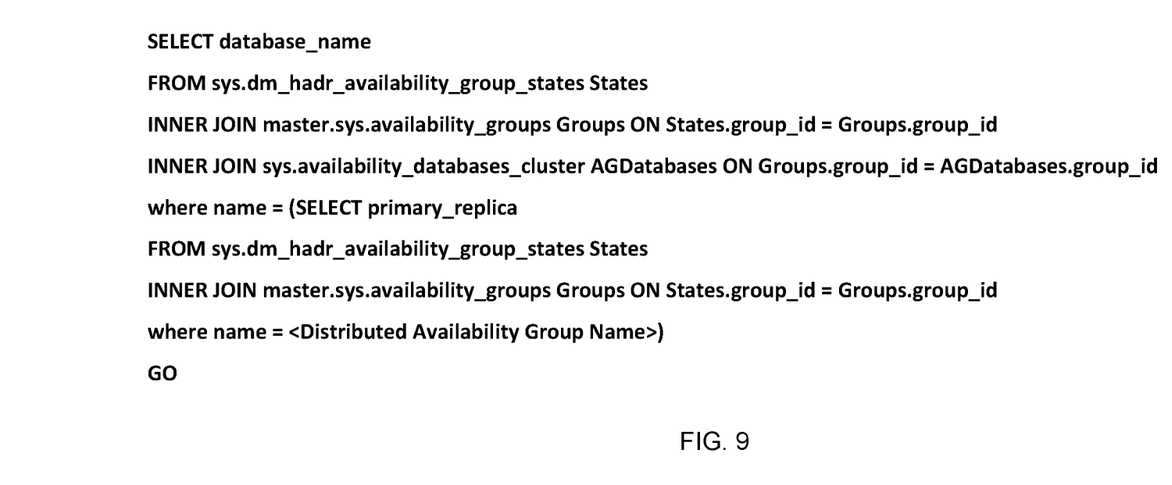
FIG. 9 shows a SQL code snippet for listing databases of the distributed availability group in accordance with one or more embodiments.

| Step | Description |
|---|---|
| 1 | Collect all the distributed availability group names configured on the current database server (e.g., SQL server). FIG. 8 shows an example of a code snippet for collecting distributed availability group names. |
| 2 | List all the databases, when distributed availability group is selected. FIG. 9 shows an example of a code snippet for listing the databases. |

As discussed, systems and techniques allow for backing up a database from any node in the distributed availability group while still maintaining the backup chain for the database. It does not matter which AAG is used to the backup—the database backup chain will be maintained and there is no need to do full backups when a failover happens and maintain different backup chains indexed under different client names for the same database. In an embodiment, this is accomplished using the distributed availability group as the index name. The distributed availability group name is used to manage the backup chain of a database conducted across multiple nodes of the distributed availability group and the backup chain is maintained even if the backups are conducted from different nodes.

In an embodiment, there is a distributed availability group that spans a first availability group and a second availability group. At an initial time, the first availability group is functioning as a primary availability group and the second availability group is functioning as a secondary availability group. The primary availability group includes a server cluster. The cluster includes a first server currently functioning as a primary server. At the initial time, an initial backup of a database in the distributed availability group is performed using the first server in the first availability group.

The first server and first availability group are currently functioning as the primary server and primary availability group, respectively. The initial backup of the database is indexed using the name of the distributed availability group rather than a name of the first server.

After the initial backup has been completed, a failover event occurs during which the second availability group transitions from functioning as a secondary availability group to functioning as a primary availability group. Thus, the second availability group, which is now functioning as the primary availability group, includes a second server that is now functioning as a primary server. In a subsequent backup of the database in the distributed availability group, the second server in the second availability group now functioning as the primary server and primary availability group, respectively, is contacted to again obtain backup preferences and settings associated with conducting a backup. The settings may include the name of the distributed availability group and a specification that backups are to be conducted using the primary server. As such, the backup application directs the second server (now functioning as the primary server) to perform a subsequent backup of the database hosted by the second server and index the subsequent backup using the name of the distributed availability group. That is, the subsequent backup is not indexed using the name of the second server even though the subsequent backup is triggered on the second server.

In an embodiment, there is a method comprising: determining that a relational database management system (RDBMS) is configured as a distributed availability group, the distributed availability group spanning first and second availability groups, each availability group comprising a cluster of servers hosting replicas of a database, one of the first or second availability groups functions as a primary availability group, and another of the first or second availability groups functions as a secondary availability group that is available as a failover target should the primary availability group become unavailable; obtaining a name of the distributed availability group; and directing, for an initial backup of the database, a first server in the first availability group to backup a replica of the database being hosted by the first server, the directing for the initial backup comprising instructing the first server to index the initial backup against the name of the distributed availability group, the name of the distributed availability group being different from a name of the first server.

The method may include directing, for a subsequent backup of the database, a second server in the second availability group to backup a replica of the database being hosted by the second server, the directing for the subsequent backup comprising instructing the second server to index the subsequent backup against the name of the distributed availability group, the name of the distributed availability group being different from a name of the second server, wherein during the subsequent backup the second availability group is functioning as the primary availability group, and wherein the initial backup of the database replica hosted by the first server comprises a full backup, and the subsequent backup of the database replica hosted by the second server comprises a differential backup. The method may include linking the initial and subsequent backups of the database using the name of the distributed availability group.

The method may include obtaining backup preferences for the distributed availability group, the backup preferences indicating whether backups should be performed using a server that functions as a primary server in the primary availability group or a server that functions as a secondary server in the primary availability group.

In an embodiment, after the initial backup of the database is completed, the database is failed over from the first availability group to the second availability group, the second availability group thereby now functioning as the primary availability group, and the method further comprises: directing, for a subsequent backup of the database, a second server in the second availability group to backup a replica of the database being hosted by the second server, the directing for the subsequent backup comprising instructing the second server to index the subsequent backup against the name of the distributed availability group.

In an embodiment, the primary availability group comprises a primary server and a first set of one or more secondary servers, and the secondary availability group comprises a forwarder server and a second set of one or more secondary servers, wherein a replica of the database hosted by the primary server accepts write operations from clients of the RDBMS, and replicas of the database hosted by the first set of the one or more secondary servers accept read-only operations from the clients, wherein the write operations are transmitted from the primary server of the primary availability group to the forwarder server of the secondary availability group, and wherein the forwarder server forwards the write operations to the second set of the one or more secondary servers of the secondary availability group.

In another embodiment, there is a system comprising: a processor; and memory configured to store one or more sequences of instructions which, when executed by the processor, cause the processor to carry out the steps of: determining that a relational database management system (RDBMS) is configured as a distributed availability group, the distributed availability group spanning first and second availability groups, each availability group comprising a cluster of servers hosting replicas of a database, one of the first or second availability groups functions as a primary availability group, and another of the first or second availability groups functions as a secondary availability group that is available as a failover target should the primary availability group become unavailable; obtaining a name of the distributed availability group; and directing, for an initial backup of the database, a first server in the first availability group to backup a replica of the database being hosted by the first server, the directing for the initial backup comprising instructing the first server to index the initial backup against the name of the distributed availability group, the name of the distributed availability group being different from a name of the first server.

In another embodiment, there is a computer program product, comprising a non-transitory computer-readable medium having a computer-readable program code embodied therein, the computer-readable program code adapted to be executed by one or more processors to implement a method comprising: determining that a relational database management system (RDBMS) is configured as a distributed availability group, the distributed availability group spanning first and second availability groups, each availability group comprising a cluster of servers hosting replicas of a database, one of the first or second availability groups functions as a primary availability group, and another of the first or second availability groups functions as a secondary availability group that is available as a failover target should the primary availability group become unavailable; obtaining a name of the distributed availability group; and directing, for an initial backup of the database, a first server in the first availability group to backup a replica of the database being hosted by the first server, the directing for the initial backup comprising instructing the first server to index the initial backup against the name of the distributed availability group, the name of the distributed availability group being different from a name of the first server.

Figure 10:
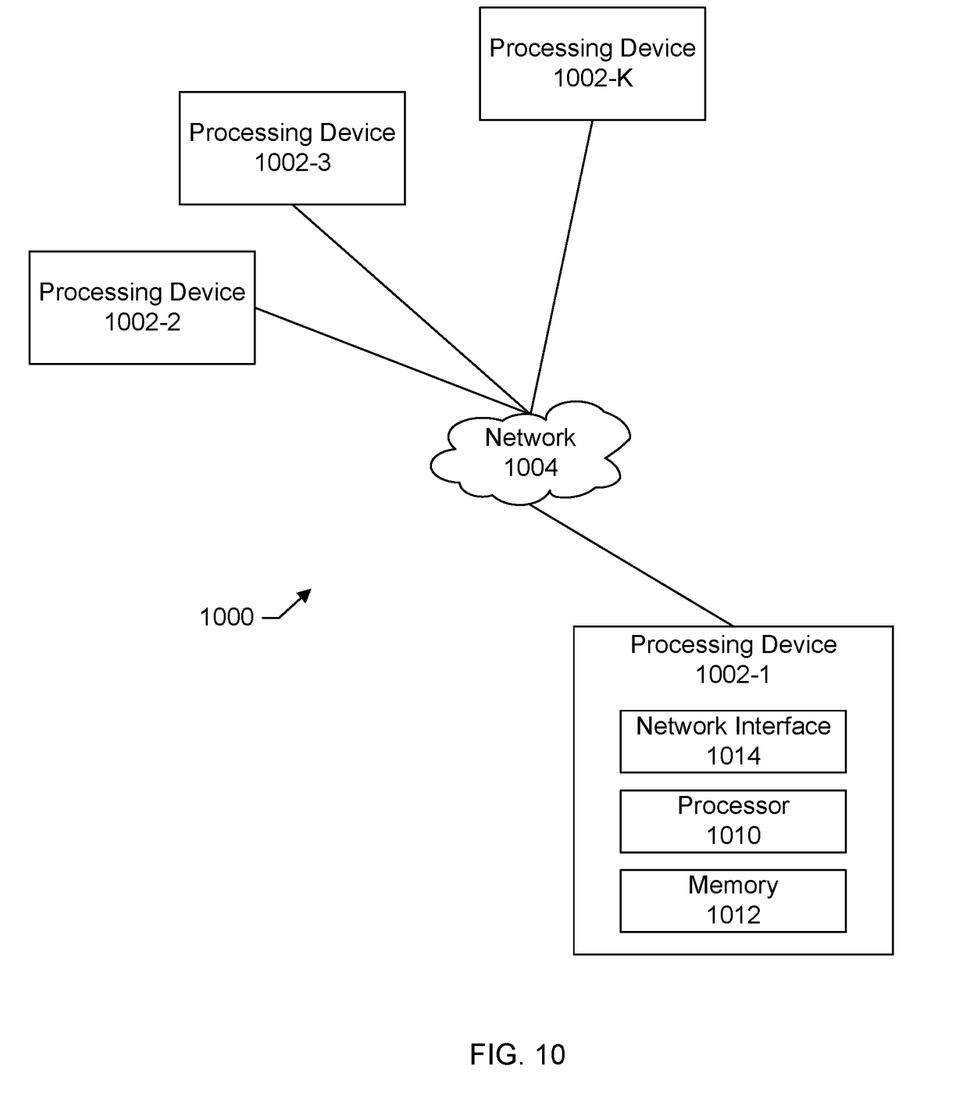
FIG. 10 shows a block diagram of a processing platform that may be utilized to implement at least a portion of an information processing system, according to one or more embodiments.

FIG. 10 shows an example of a processing platform 1000. The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 1000 are illustratively implemented in the form of software running on one or more processing devices.

Figure 11:
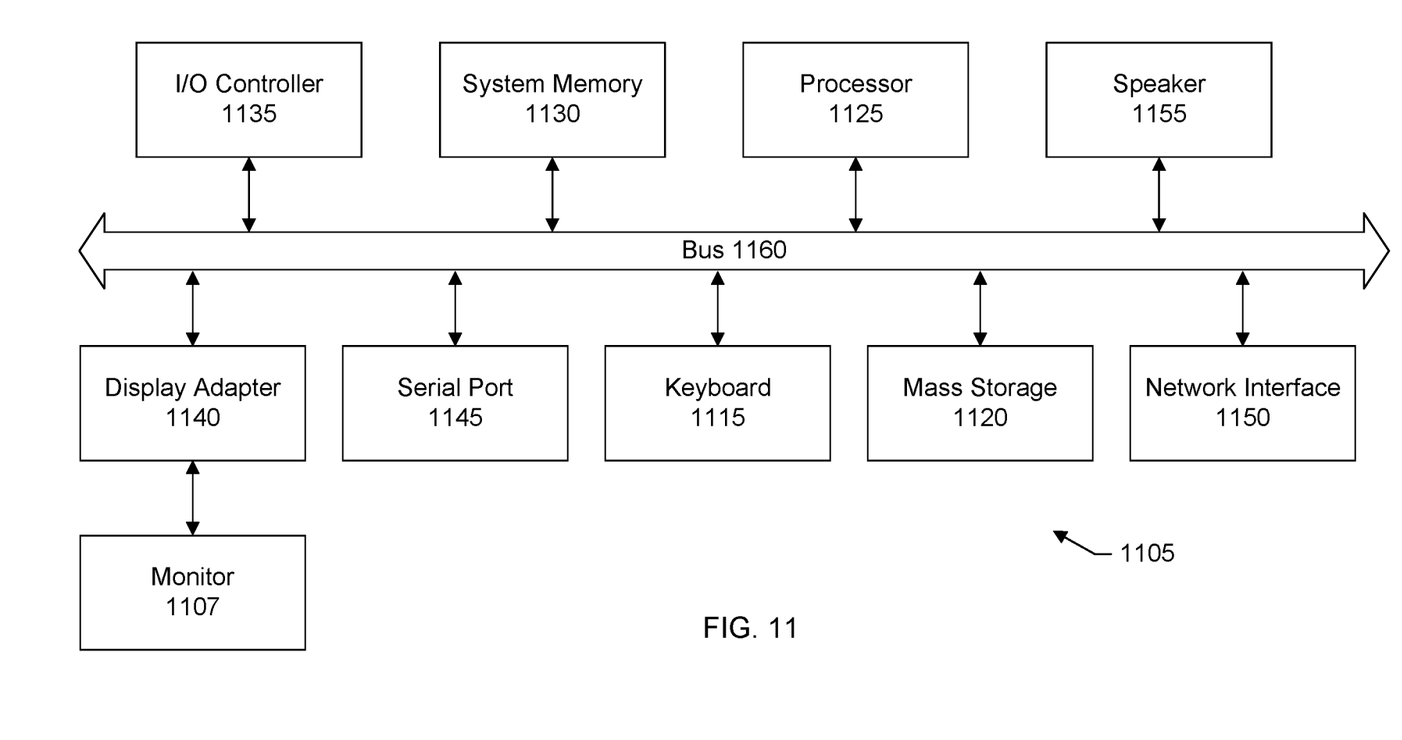
FIG. 11 shows a block diagram of a computer system suitable for use with the information processing system, according to one or more embodiments.

FIG. 11 shows a system block diagram of a computer system 1105 used to execute the software of the present system described herein. The computer system includes a monitor 1107, keyboard 1115, and mass storage devices 1120. Computer system 1105 further includes subsystems such as central processor 1125, system memory 1130, input/output (I/O) controller 1135, display adapter 1140, serial or universal serial bus (USB) port 1145, network interface 1150, and speaker 1155. The system may also be used with computer systems with additional or fewer subsystems. For example, a computer system could include more than one processor 1125 (i.e., a multiprocessor system) or a system may include a cache memory.

Arrows such as 1160 represent the system bus architecture of computer system 1105. However, these arrows are illustrative of any interconnection scheme serving to link the subsystems. For example, speaker 1155 could be connected to the other subsystems through a port or have an internal direct connection to central processor 1125. The processor may include multiple processors or a multicore processor, which may permit parallel processing of information. Computer system 1105 shown in FIG. 11 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
determining that a relational database management system (RDBMS) is configured as a distributed availability group, the distributed availability group spanning first and second availability groups, each availability group comprising a cluster of servers, each server of the cluster of servers hosting a replica of a database, one of the first or second availability groups functions as a primary availability group, and another of the first or second availability groups functions as a secondary availability group that is available as a failover target should the primary availability group become unavailable;
obtaining a name of the distributed availability group; and
directing, for an initial backup of the database, a first server in the first availability group to backup a replica of the database being hosted by the first server, the directing for the initial backup comprising instructing the first server to index the initial backup against the name of the distributed availability group, the name of the distributed availability group being different from a name of the first server.

2. The method of claim 1 further comprising:
directing, for a subsequent backup of the database, a second server in the second availability group to backup a replica of the database being hosted by the second server, the directing for the subsequent backup comprising instructing the second server to index the subsequent backup against the name of the distributed availability group, the name of the distributed availability group being different from a name of the second server, wherein during the subsequent backup the second availability group is functioning as the primary availability group, and wherein the initial backup of the database replica hosted by the first server comprises a full backup, and the subsequent backup of the database replica hosted by the second server comprises a differential backup.

3. The method of claim 2 further comprising:
linking the initial and subsequent backups of the database using the name of the distributed availability group.

4. The method of claim 1 further comprising:
obtaining backup preferences for the distributed availability group, the backup preferences indicating whether backups should be performed using a server that functions as a primary server in the primary availability group or a server that functions as a secondary server in the primary availability group.

5. The method of claim 1 wherein after the initial backup of the database is completed, the database is failed over from the first availability group to the second availability group, the second availability group thereby now functioning as the primary availability group, and the method further comprises:
directing, for a subsequent backup of the database, a second server in the second availability group to backup a replica of the database being hosted by the second server, the directing for the subsequent backup comprising instructing the second server to index the subsequent backup against the name of the distributed availability group.

6. The method of claim 1 wherein the primary availability group comprises a primary server and a first set of one or more secondary servers, and the secondary availability group comprises a forwarder server and a second set of one or more secondary servers,
wherein a replica of the database hosted by the primary server accepts write operations from clients of the RDBMS, and replicas of the database hosted by the first set of the one or more secondary servers accept read-only operations from the clients,
wherein the write operations are transmitted from the primary server of the primary availability group to the forwarder server of the secondary availability group, and
wherein the forwarder server forwards the write operations to the second set of the one or more secondary servers of the secondary availability group.

7. A system comprising: a processor; and memory configured to store one or more sequences of instructions which, when executed by the processor, cause the processor to carry out the steps of:
determining that a relational database management system (RDBMS) is configured as a distributed availability group, the distributed availability group spanning first and second availability groups, each availability group comprising a cluster of servers, each server of the cluster of servers hosting a replica of a database, one of the first or second availability groups functions as a primary availability group, and another of the first or second availability groups functions as a secondary availability group that is available as a failover target should the primary availability group become unavailable;
obtaining a name of the distributed availability group; and
directing, for an initial backup of the database, a first server in the first availability group to backup a replica of the database being hosted by the first server, the directing for the initial backup comprising instructing the first server to index the initial backup against the name of the distributed availability group, the name of the distributed availability group being different from a name of the first server.

8. The system of claim 7 wherein the processor further carries out the steps of:

directing, for a subsequent backup of the database, a second server in the second availability group to backup a replica of the database being hosted by the second server, the directing for the subsequent backup comprising instructing the second server to index the subsequent backup against the name of the distributed availability group, the name of the distributed availability group being different from a name of the second server, wherein during the subsequent backup the second availability group is functioning as the primary availability group, and wherein the initial backup of the database replica hosted by the first server comprises a full backup, and the subsequent backup of the database replica hosted by the second server comprises a differential backup.

9. The system of claim 8 wherein the processor further carries out the steps of:

linking the initial and subsequent backups of the database using the name of the distributed availability group.

10. The system of claim 7 wherein the processor further carries out the steps of:

obtaining backup preferences for the distributed availability group, the backup preferences indicating whether backups should be performed using a server that functions as a primary server in the primary availability group or a server that functions as a secondary server in the primary availability group.

11. The system of claim 7 wherein after the initial backup of the database is completed, the database is failed over from the first availability group to the second availability group, the second availability group thereby now functioning as the primary availability group, and the processor further carries out the steps of:

directing, for a subsequent backup of the database, a second server in the second availability group to backup a replica of the database being hosted by the second server, the directing for the subsequent backup comprising instructing the second server to index the subsequent backup against the name of the distributed availability group.

12. The system of claim 7 wherein the primary availability group comprises a primary server and a first set of one or more secondary servers, and the secondary availability group comprises a forwarder server and a second set of one or more secondary servers, wherein a replica of the database hosted by the primary server accepts write operations from clients of the RDBMS, and replicas of the database hosted by the first set of the one or more secondary servers accept read-only operations from the clients, wherein the write operations are transmitted from the primary server of the primary availability group to the forwarder server of the secondary availability group, and wherein the forwarder server forwards the write operations to the second set of the one or more secondary servers of the secondary availability group.

13. A computer program product, comprising a non-transitory computer-readable medium having a computer-readable program code embodied therein, the computer-readable program code adapted to be executed by one or more processors to implement a method comprising:

determining that a relational database management system (RDBMS) is configured as a distributed availability group, the distributed availability group spanning first and second availability groups, each availability group comprising a cluster of servers, each server of the cluster of servers hosting a replica of a database, one of the first or second availability groups functions as a primary availability group, and another of the first or second availability groups functions as a secondary availability group that is available as a failover target should the primary availability group become unavailable;

obtaining a name of the distributed availability group; and directing, for an initial backup of the database, a first server in the first availability group to backup a replica of the database being hosted by the first server, the directing for the initial backup comprising instructing the first server to index the initial backup against the name of the distributed availability group, the name of the distributed availability group being different from a name of the first server.

14. The computer program product of claim 13 wherein the method further comprises:

directing, for a subsequent backup of the database, a second server in the second availability group to backup a replica of the database being hosted by the second server, the directing for the subsequent backup comprising instructing the second server to index the subsequent backup against the name of the distributed availability group, the name of the distributed availability group being different from a name of the second server, wherein during the subsequent backup the second availability group is functioning as the primary availability group, and wherein the initial backup of the database replica hosted by the first server comprises a full backup, and the subsequent backup of the database replica hosted by the second server comprises a differential backup.

15. The computer program product of claim 14 wherein the method further comprises:

linking the initial and subsequent backups of the database using the name of the distributed availability group.

16. The computer program product of claim 13 wherein the method further comprises:

obtaining backup preferences for the distributed availability group, the backup preferences indicating whether backups should be performed using a server that functions as a primary server in the primary availability group or a server that functions as a secondary server in the primary availability group.

17. The computer program product of claim 13 wherein after the initial backup of the database is completed, the database is failed over from the first availability group to the second availability group, the second availability group thereby now functioning as the primary availability group, and the method further comprises:

directing, for a subsequent backup of the database, a second server in the second availability group to backup a replica of the database being hosted by the second server, the directing for the subsequent backup comprising instructing the second server to index the subsequent backup against the name of the distributed availability group.

18. The computer program product of claim 13 wherein the primary availability group comprises a primary server and a first set of one or more secondary servers, and the secondary availability group comprises a forwarder server and a second set of one or more secondary servers,
  wherein a replica of the database hosted by the primary server accepts write operations from clients of the RDBMS, and replicas of the database hosted by the first set of the one or more secondary servers accept read-only operations from the clients,
  wherein the write operations are transmitted from the primary server of the primary availability group to the forwarder server of the secondary availability group, and
  wherein the forwarder server forwards the write operations to the second set of the one or more secondary servers of the secondary availability group.

* * * * *